(12) United States Patent
Ogram

(10) Patent No.: US 11,858,361 B2
(45) Date of Patent: Jan. 2, 2024

(54) SUPPLEMENTAL BATTERY FOR AN ELECTRIC VEHICLE

(71) Applicant: Mark Ogram, Tucson, AZ (US)

(72) Inventor: Mark Ogram, Tucson, AZ (US)

( * ) Notice: Subject to any disclaimer, the term of this patent is extended or adjusted under 35 U.S.C. 154(b) by 149 days.

(21) Appl. No.: 17/803,327

(22) Filed: May 12, 2022

(65) Prior Publication Data

US 2023/0113825 A1      Apr. 13, 2023

Related U.S. Application Data

(63) Continuation-in-part of application No. 17/803,241, filed on Mar. 29, 2022, now abandoned, which is a continuation of application No. 17/300,768, filed on Oct. 29, 2021, now abandoned, which is a continuation-in-part of application No. 17/300,357, filed on May 24, 2021, now Pat. No. 11,220,186.

(51) Int. Cl.
  *B60L 50/60*    (2019.01)
  *B60L 50/62*    (2019.01)
  *F02N 11/08*    (2006.01)
  *B60L 53/22*    (2019.01)

(52) U.S. Cl.
  CPC ............. *B60L 50/60* (2019.02); *B60L 50/62* (2019.02); *B60L 53/22* (2019.02); *F02N 11/0807* (2013.01)

(58) Field of Classification Search
  CPC ....................................................... B60L 50/60
  USPC ............................................................ 320/109
  See application file for complete search history.

(56) References Cited

U.S. PATENT DOCUMENTS

| | | | |
|---|---|---|---|
| 3,784,230 A | 1/1974 | Worrall | |
| 4,457,546 A | 7/1984 | Wiant | |
| 5,836,494 A * | 11/1998 | Grunsted | B60R 9/06 224/524 |
| 6,390,215 B1 * | 5/2002 | Kodama | B60L 50/62 180/2.1 |
| 6,445,080 B1 * | 9/2002 | Daqoa | B60K 5/00 307/9.1 |
| 6,559,558 B2 | 5/2003 | Quesnel | |
| 7,140,338 B2 | 11/2006 | Janisch | |
| 8,562,011 B1 | 10/2013 | Smith | |
| 10,189,442 B1 | 1/2019 | Ford | |
| 10,308,158 B2 | 6/2019 | Quenzi | |
| 10,696,112 B2 | 6/2020 | Meingast | |
| 10,836,225 B2 | 11/2020 | Robinson | |
| 10,967,750 B2 | 4/2021 | Lee | |
| 10,983,166 B2 | 4/2021 | Hellgren | |
| 10,989,087 B2 | 4/2021 | Yokoi | |
| 10,989,273 B2 | 4/2021 | Ott | |
| 10,994,719 B2 | 5/2021 | Obata | |
| 11,001,266 B2 | 5/2021 | Kasahara | |

(Continued)

OTHER PUBLICATIONS

US 10,089,524 B2, 10/2018, Laundry (withdrawn)

*Primary Examiner* — Jerry D Robbins
(74) *Attorney, Agent, or Firm* — Mark Ogram

(57) ABSTRACT

An electric vehicle having an internal rechargeable battery which is recharged via a recharging connector. The electric vehicle has an external battery secured to an exterior of the electric vehicle. The external battery communicates electricity to the internal rechargeable battery via the recharging connector. The external battery being carried by a cantilevered platform from the electric vehicle, pulled by a trailer, or mounted to the roof of the electric vehicle.

15 Claims, 7 Drawing Sheets

(56) References Cited

U.S. PATENT DOCUMENTS

| | | | |
|---|---|---|---|
| 2007/0252452 A1* | 11/2007 | Ishimoto | B60L 50/20 |
| | | | 310/67 A |
| 2010/0065344 A1 | 3/2010 | Collings | |
| 2013/0102162 A1* | 4/2013 | Holmes | H01R 13/5213 |
| | | | 439/34 |
| 2013/0257145 A1 | 10/2013 | Caldeira | |
| 2014/0327405 A1* | 11/2014 | Carkner | H02J 7/02 |
| | | | 320/128 |
| 2014/0342591 A1* | 11/2014 | Kim | B60L 53/16 |
| | | | 439/159 |
| 2014/0375272 A1* | 12/2014 | Johnsen | B60L 58/19 |
| | | | 320/136 |
| 2017/0232859 A1* | 8/2017 | Li | B60L 53/80 |
| | | | 414/495 |
| 2022/0371463 A1* | 11/2022 | Stubbs | H02J 7/0013 |

* cited by examiner

1414CE

1414CE

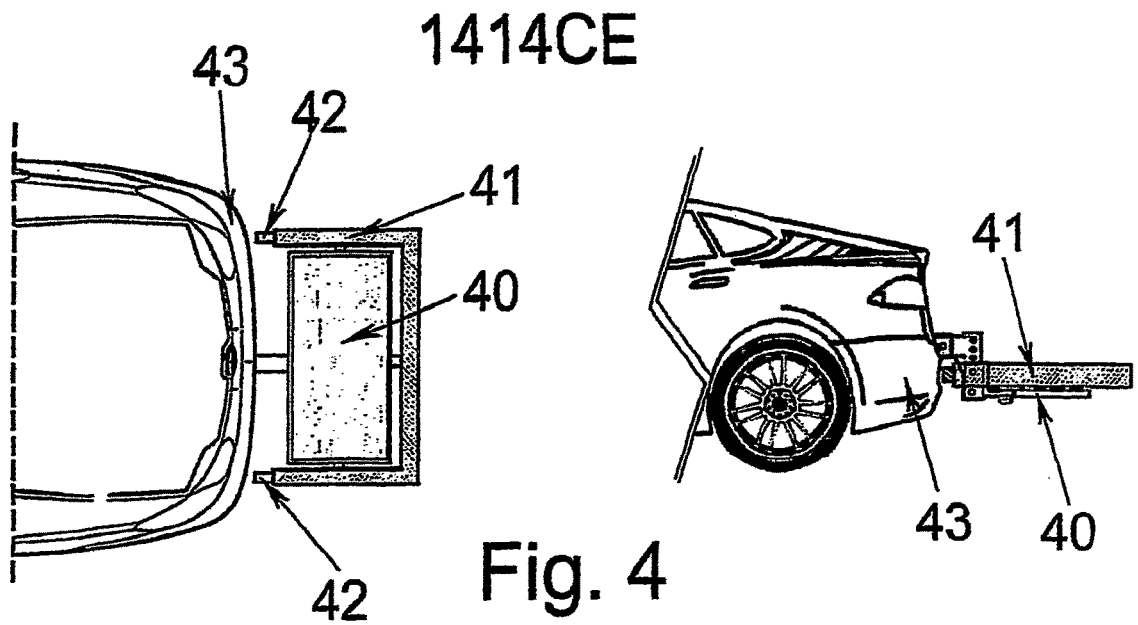
Fig. 4
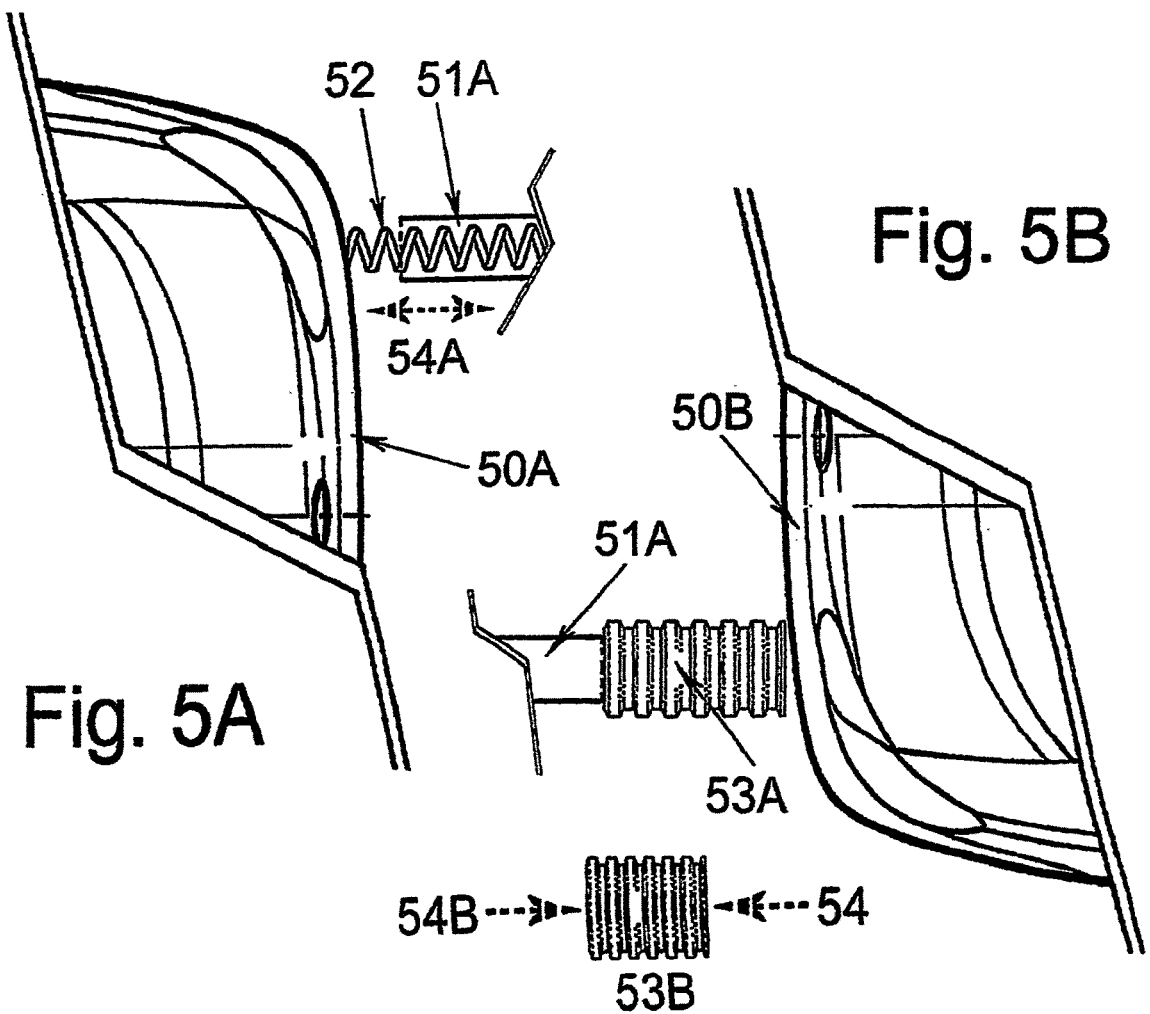
Fig. 5A
Fig. 5B

1414CE.1a1

SUPPLEMENTAL BATTERY FOR AN ELECTRIC VEHICLE

PRIORITY

This is a continuation-in-part of U.S. patent application Ser. No. 17/803,241, entitled "Range Enhancing Platform" filed on Mar. 29, 2022; which was a continuation of U.S. patent Ser. No. 17/300,768, filed on Oct. 29, 2021, and entitled "Range Enhancing Platform"; which was a continuation in part of U.S. patent application Ser. No. 17/300,357, entitled "Range Enhancing Mechanism" filed on May 24, 2021, now U.S. Pat. No. 11,220,186.

BACKGROUND OF THE INVENTION

This invention relates generally to electrical vehicles and more particularly to a ready and fast mechanism to provide an on-the-go "recharge" to the vehicle.

Electric vehicles are touted as being environmentally friendly and as being more economical to operate. Estimates are that per-mile costs for fuel/energy, the electric vehicle is about half the cost of gasoline vehicles. With the cost of gasoline and diesel rising, the consumer is evaluating the electric vehicles in greater depth.

The biggest limiting factor for the potential consumer of an electric vehicle, is the limited range between recharging the battery. Often this range is only 300-400 miles which is more than suitable for suburban driving, but for interstate trips, the range limitation becomes problematic.

Further, if the battery becomes spent or exhausted, then the vehicle is left completely stranded. At the present time, the only solution is a tow to the next charging station.

It is clear there is a need to improve electric vehicles in order to make them acceptable to the general public.

SUMMARY OF THE INVENTION

The invention provides an assist apparatus for an electric vehicle which is powered by rechargeable batteries. To assist in the range of the electric vehicle, a platform is secured or towed by the vehicle. On the platform is a hydrocarbon motor that generates electricity. The hydrocarbon motor is activated, either manually via a handheld transmitter, via a switch connected to the hydrocarbon motor, or automatically by sensors in the electric vehicle to charge the rechargeable batteries within the electric vehicle.

In general terms, the invention involves an assist apparatus for an electric vehicle. The assist apparatus, when operating, provides a stream of electricity to the rechargeable battery on the electric vehicle. It is contemplated that the assist apparatus would not be used for traditional commutes but would be applicable for longer distances past the range of the electric vehicle's rechargeable battery, typically through a rental agency.

There are many versions of power systems used to recharge the battery. These include, but not limited to: U.S. Pat. No. 10,989,273, entitled "Power Unit" issued to Obrist et al. on Apr. 27, 2021; incorporated hereinto by reference.

The assist apparatus involves a platform which is securable to the vehicle (hanging on the bumper, attached to the towing slide, or via trailer) on which a traditional internal combustion engine is mounted. The internal combustion engine powers a generator and provides electricity to recharge the rechargeable battery traditionally found in an electric vehicle via an electrical cable/connection.

The preferred embodiment has the engine mounted on a cantilever platform from the rear of the vehicle.

Those of ordinary skill in the art readily recognize a variety of electrical connections which may be employed in the context of charging the rechargeable battery, including, but not limited to: U.S. Pat. No. 0,967,750, entitled "System and Method for Charging Plug-in Hybrid Vehicle" issued to Lee et al. on Apr. 6, 2021; U.S. Pat. No. 10,989,087, entitled "Plug-in Hybrid Vehicle" issued to Yokoi on Apr. 27, 2021; all of which are incorporated hereinto by reference.

To operate the internal combustion engine, the preferred method is via a radio frequency handheld mechanism. The user, when they want to provide additional charge to the rechargeable battery, activates the internal combustion engine using he handheld transmitter; when done, the same radio frequency handheld transmitter is used to deactivate the internal combustion engine. In this way, the rechargeable battery is charged "on the go" without having to stop at a charging station.

Radio Frequency mechanisms are well known in the art for activating engines. These include: U.S. Pat. No. 6,559,558, entitled "Smart Car Starter" issued to Quesnel et al. on May 6, 2003; U.S. Pat. No. 7,140,338, entitled "Snowmobile Remote Ignition System" issued to Janisch on Nov. 28, 2006; U.S. Pat. No. 10,189,442, entitled "Remote Vehicle Starter and Appliance Activation System" issued to Ford et al. on Jan. 29, 2019; all of which are incorporated hereinto by reference.

Further, should the electric vehicle become stranded due to a depleted rechargeable battery, a service provider is able to bring the assist apparatus to the site and recharge the battery, allowing the previously stranded driver to continue.

Besides the handheld mechanism described above, in another embodiment, the electric vehicle is equipped with a sensor on the rechargeable battery which activates, when needed, the assist apparatus.

A variety of mechanisms are used to monitor the rechargeable battery including, but not limited to: U.S. Pat. No. 10,983,166, entitled "Estimation of Battery Parameters" issued to Hellgren et al. on Apr. 20, 2021; U.S. Pat. No. 10,994,719, entitled "Method and Device for Controlling Hybrid Vehicle" issued to Obata on May 4, 2021; U.S. Pat. No. 11,001,266, entitled "Hybrid Vehicle Drive System" issued to Kasahara on May 11, 2021; all of which are incorporated hereinto by reference.

An important aspect of the present invention is the ability to protect the assist apparatus from damage from impact with either another moving vehicle (being rear ended) or by backing into a solid object (e.g. a wall). To provide this protection, a secondary bumper (preferably either metal or hardened rubber) issued. The preferred bumper is U-shaped and arranged around three sides of the platform.

In one embodiment of the invention, the secondary bumper contacts the primary bumper on the electric vehicle allowing the electric vehicle's bumper to provide more endurance to the secondary bumper.

In another embodiment, springs extend from the "legs" of the U-shaped secondary bumper to engage (either on impact or all the time) with the vehicle's bumper. The use of springs diminishes the possibility of doing serious damage on what would be considered a "minor" impact.

In yet another embodiment of the secondary bumper, collapsible cylinders are use in lieu of the springs. These collapsible cylinders are crushable on impact and are readily replaced later.

As noted earlier, the platform and the assist apparatus are securable to the bumper (hung from the bumper), are supported by a slide hitch receptacle, or on a small trailer that is pulled by the electric vehicle. All of these embodiments make the present invention ideal for commercialization through a rental organization such as an establishment that rents/leases cars and other items for over the road travel.

Those of ordinary skill in the art readily recognize a variety of trailer mechanisms, including, but not limited to those described in: U.S. Pat. No. 8,562,011, entitled "Utility Trailer" issued to Smith on Oct. 22, 2013; U.S. Pat. No. 10,308,158, entitled "Utility Trailer with Movable Bed" issued to Quenzi et al. on Jun. 4, 2019; all of which are incorporated hereinto by reference.

Slide attachments for towing tailers are also well known in the art and include: U.S. Pat. No. 10,099,524, entitled "Adjustable Trailer Hitch" issued to Laundry on Oct. 16, 2018; and U.S. Pat. No. 10,696,112, entitled "Lightweight Hitch Structure" issued to Meingast et al. on Jun. 3, 2020; U.S. Pat. No. 10,836,225, entitled "Detachable Receiver" issued to Robinson et al. on Nov. 17, 2020; all of which are incorporated hereinto by reference.

Ideally, the internal combustion engine uses a variety of carbon based fuels such as gasoline, diesel, propane, and natural gas.

In one embodiment of the invention, the charging engine is mountable to the roof of the electric vehicle. In this embodiment, the driver of the vehicle does not have to change their driving/parking habits as the vehicle's outside dimensions remain the same.

One embodiment of the invention is an electric vehicle having an internal rechargeable battery. This rechargeable battery is recharged via a recharging connector. This embodiment of an electric vehicle has an external battery secured to an exterior of the electric vehicle. The external battery communicates electricity to the internal rechargeable battery via the recharging connector. Ideally the external battery is carried by a cantilevered platform from the electric vehicle, pulled by a trailer, or mounted to the roof of the electric vehicle.

As noted, the entire electric vehicle assembly of this embodiment employs the internal rechargeable battery and the recharging connector used to communicate electricity from an external source into the internal rechargeable battery. In this assembly, an external battery is employed and is secured to an exterior of the electric vehicle. Electricity from the external battery is communicated to the internal rechargeable battery via the recharging connector.

In the preferred embodiment of this embodiment, the external battery is a rechargeable battery allowing the external battery to be recharged periodically by the user.

The external battery is secured to the electric vehicle via a mounting mechanism which is either supported by the electric vehicle or is towed therefrom.

Ideally, the external battery is supported by a cantilevered platform which is mountable to a slide secured to the electric vehicle. Other embodiments mount the external battery onto the roof of the electric vehicle and still others place the external battery on a trailer to be towed by the electric vehicle. Ideally, the external battery is removable from the platform.

Securing the external battery to any of these platforms is done through a variety of mechanisms. In one mechanism, the external battery includes protruding teeth which engage with the mounting mechanism includes recesses to engage the protruding teeth. In another mechanism, the opposite arrangement is done in which protruding teeth from the mounting mechanism engage recesses within the external battery. In yet another mechanism used to secure the external battery to the platform, the external battery includes flanges which are grasped/compressed by the mounting mechanism.

In all of these mounting mechanisms, ideally the external battery is selectively releasable from the mounting mechanism allowing the external battery to be replaced readily. Typically, this release is done manually.

In one embodiment of the invention, an electric vehicle accessory is created which assists in the connecting and disconnecting of the external battery from the system. In this embodiment, the platform as outlined above, is used. The platform has a mounting surface upon which the external electrical battery is placed. The external battery is held in place using at least two engagement mechanisms which selectively engage the external battery to secure it to the mounting surface using any of the techniques as outlined above to the platform.

The platform further includes an electrical connector which engages with an electrical connector from the external battery and selectively communicates electricity from the external battery to the internal rechargeable battery. This connection is only accomplished when the engagement mechanism is engaged, which also connects the external battery as well.

Activation of the engagement mechanism and the relay switch connecting the external battery to the electric vehicle's electrical connector, is accomplished either manually (ideally using a lever) or via an electrical motor. an external battery placed on the mounting surface of the platform. The external battery has an electrical cable or cable securable to the electrical connector of the platform. By electrically isolating the external battery from the internal rechargeable battery, the external battery can be removed safely.

The invention, together with various embodiments thereof, will be explained in detail by the accompanying drawings and the following descriptions thereof.

DRAWINGS IN BRIEF

FIG. 4 illustrates the preferred secondary bumper protection of the assist system in which the secondary bumper contacts the bumper on the vehicle.

FIGS. 5A and 5B illustrate two embodiments which are meant to reduce damage due to impact of the secondary bumper.

Figure 8A:
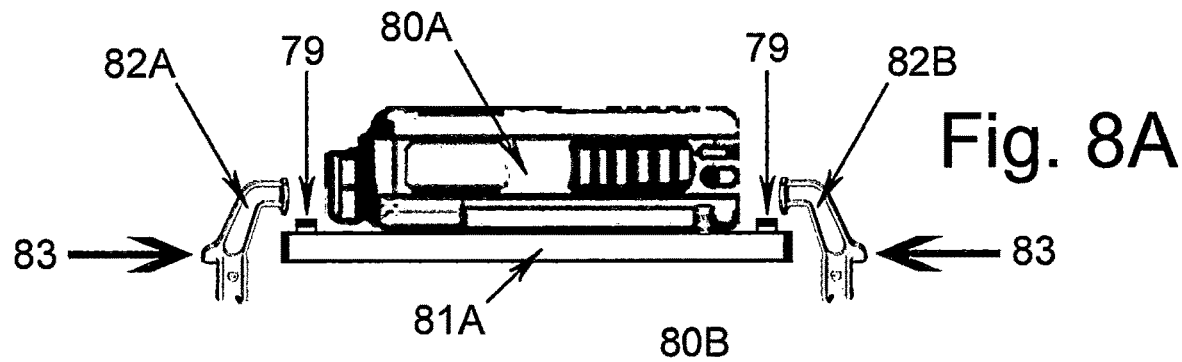
Figure 8B:
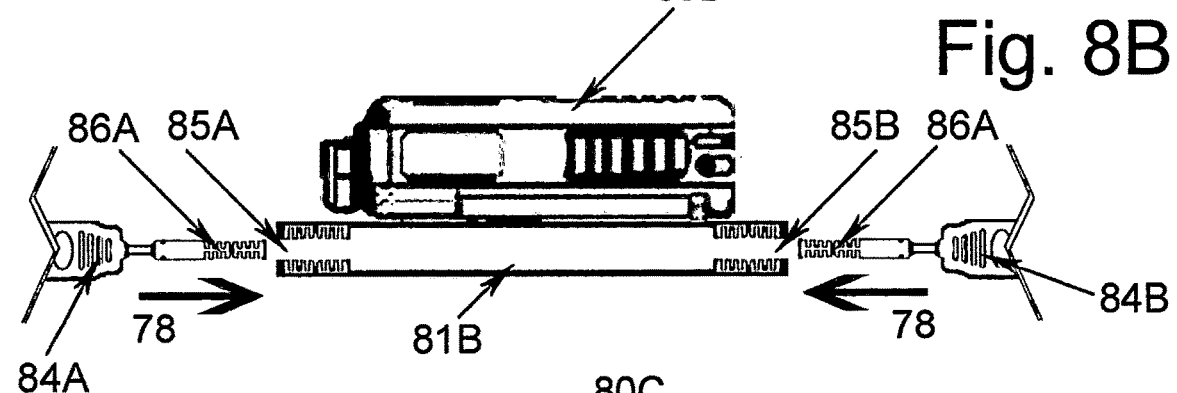
Figure 8C:
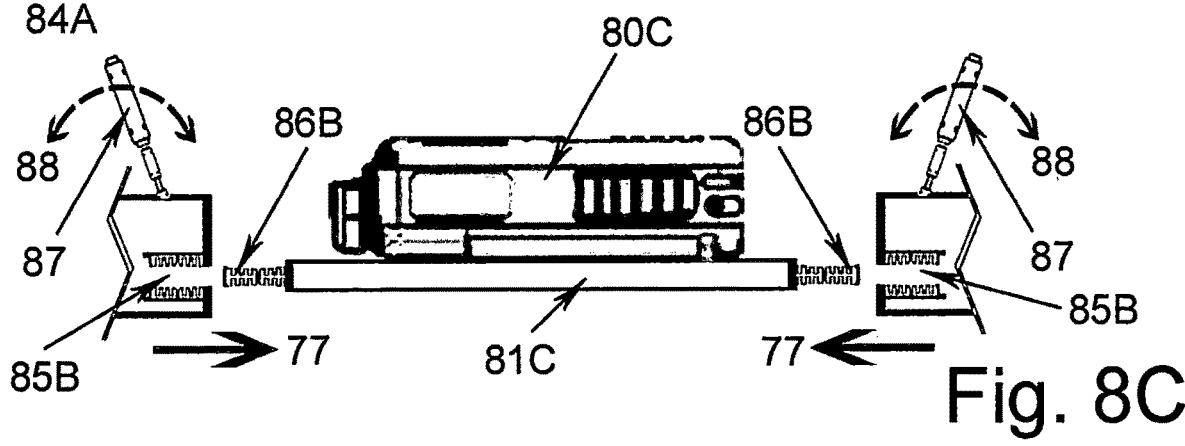

FIGS. 8A, 8B, and 8C illustrate different mounting mechanisms for the auxiliary battery.

Figure 9A:
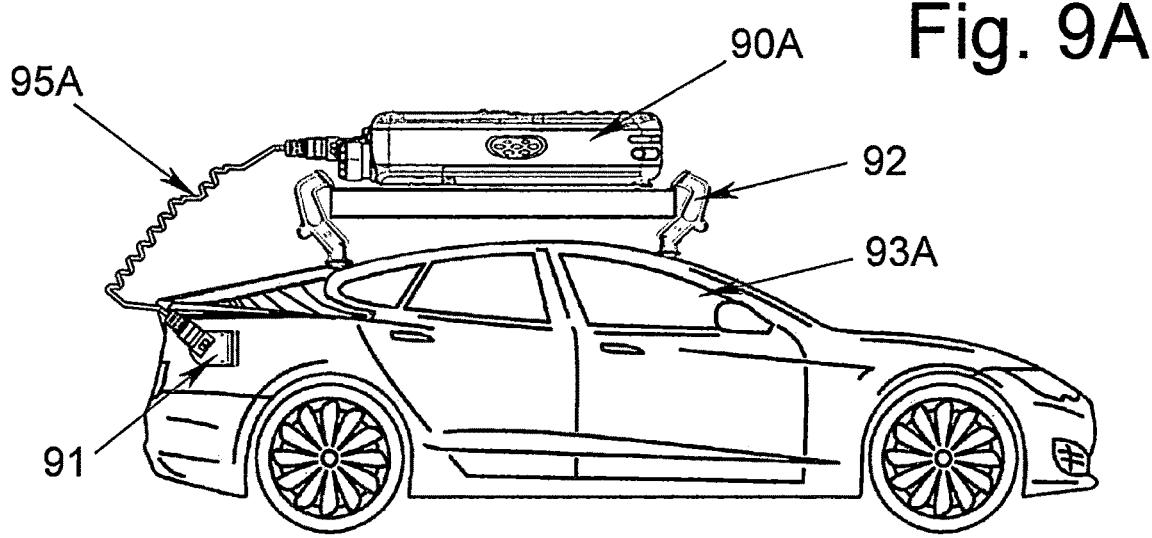
Figure 9B:
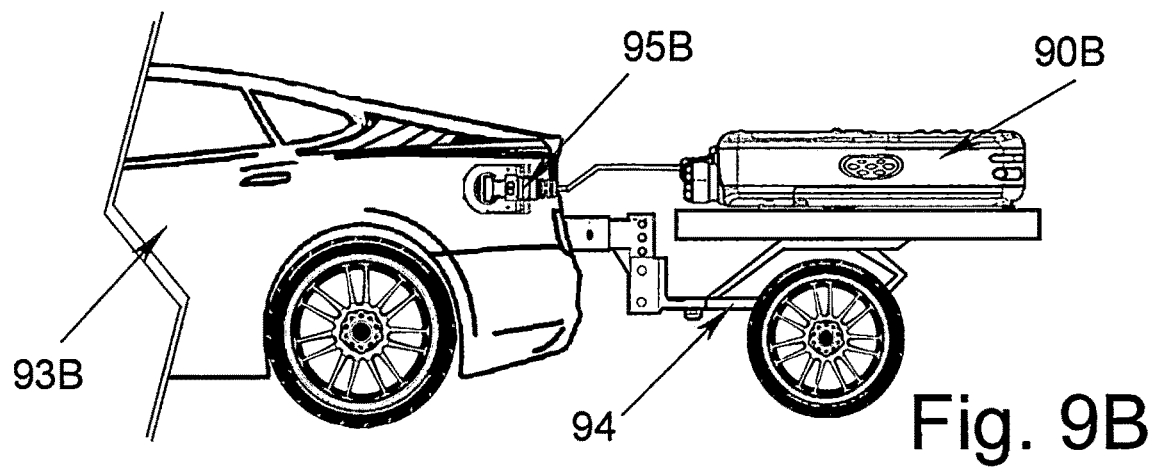

FIGS. 9A and 9B illustrate alternative mounting/towing mechanisms for the auxiliary battery.

Figure 10A:
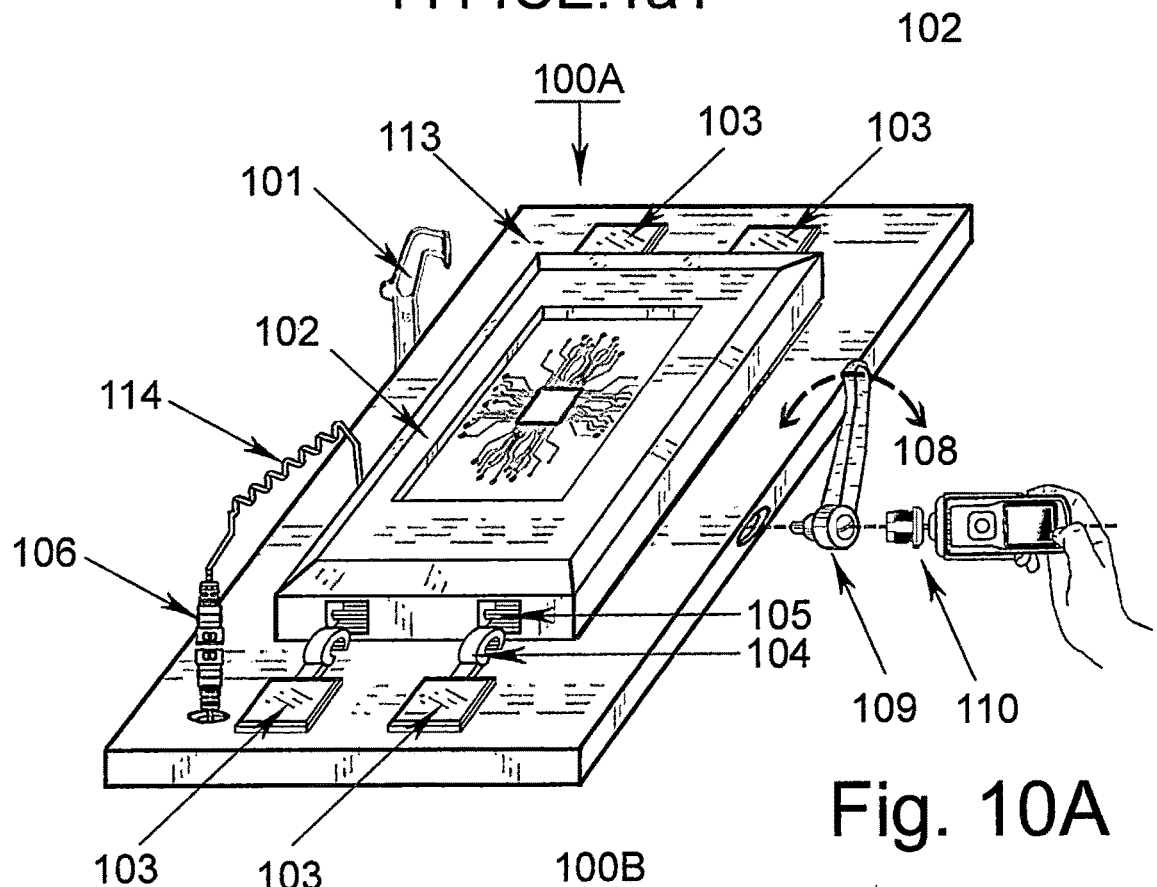

FIG. 10A is a perspective view of the upper side of an embodiment of the invention.

Figure 10B:
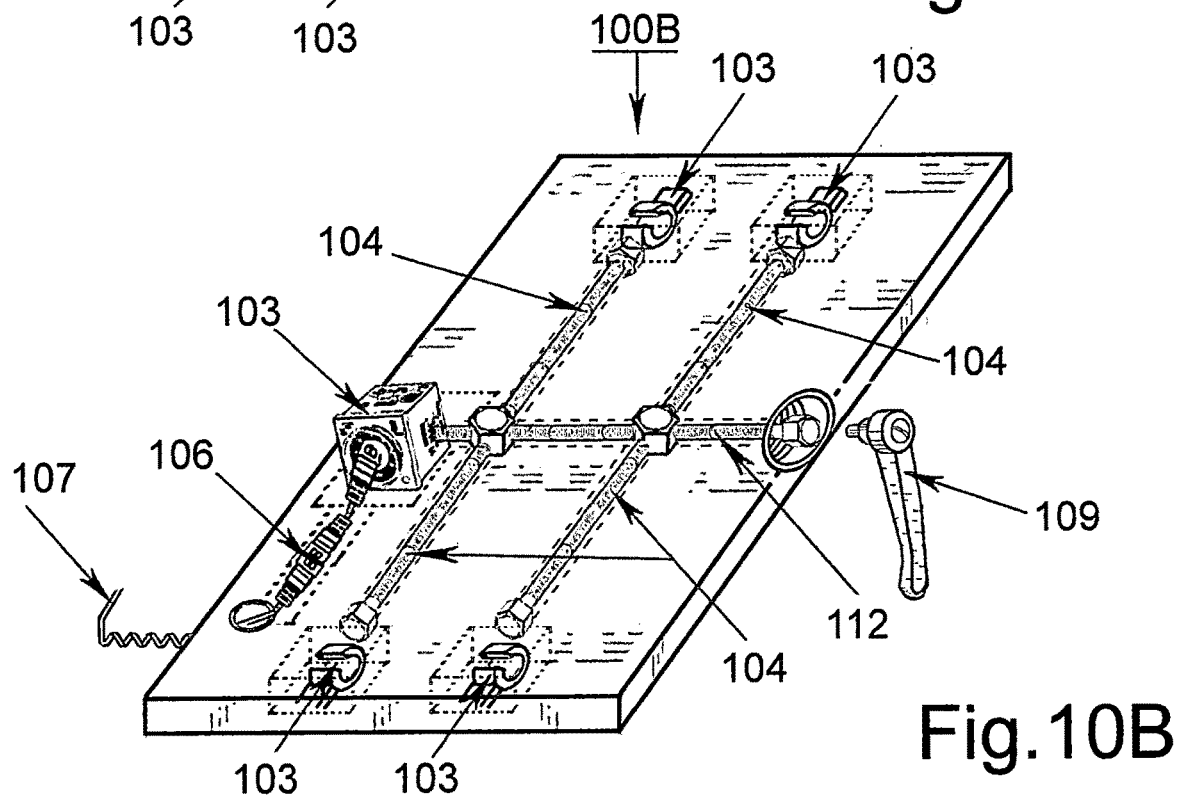

FIG. 10B is a perspective view of the underside of the an embodiment of the invention relative to FIG. 10A.

Figure 11:
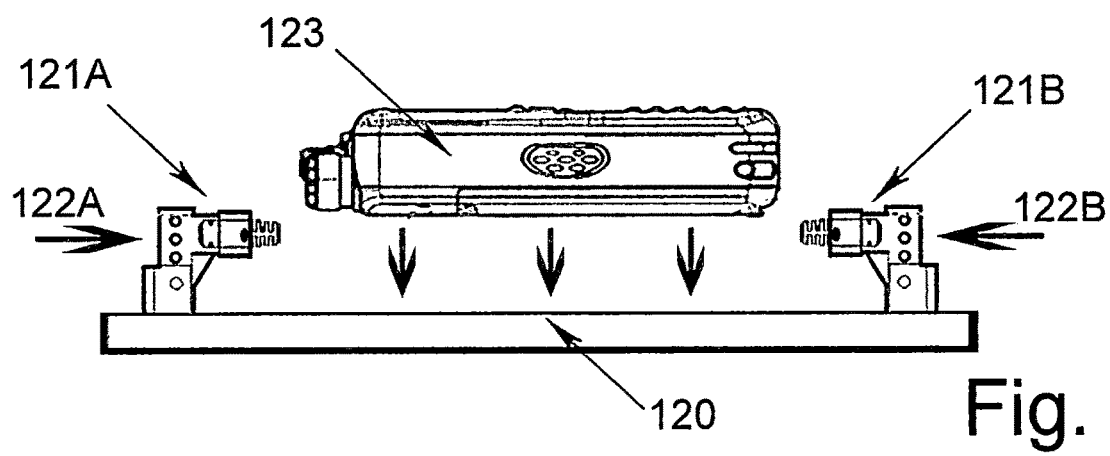

FIG. 11 illustrates a mounting platform.

DRAWINGS IN DETAIL

Figure 1A:
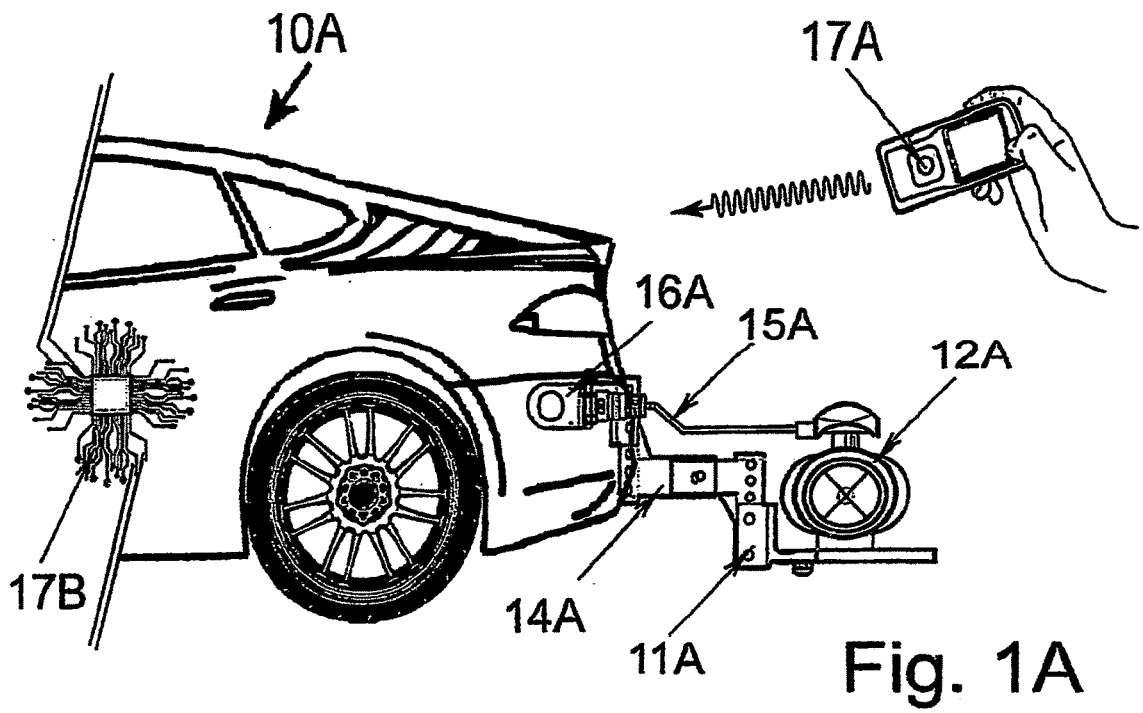
FIGS. 1A and 1B are side and top views of the preferred embodiment of the invention wherein the assist system is secured to the vehicle via a towing slide mount.
Figure 1B:
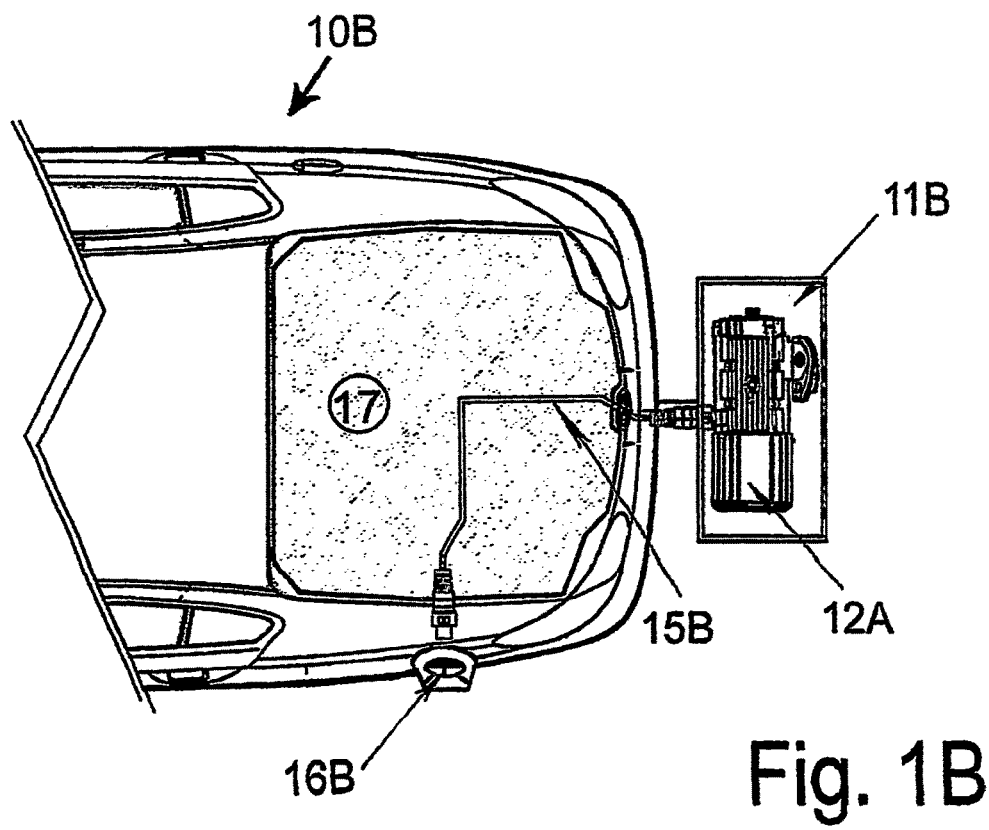

FIGS. 1A and 1B are side and top views of the preferred embodiment of the invention wherein the assist system is secured to the vehicle via a towing slide mount.

Referring to FIG. 1A, vehicle 10A has a slide mount 14A secured thereto. Platform 11A is secured into slide mount and presents a foundation for the mounting of motor/generator 12A. Electrical energy from motor/generator 12A is fed through electrical cable 15A which is connected to receptacle 16A of the electric vehicle 10A.

Receptacle 16A is the traditional connector used to recharge the rechargeable battery (not shown) within vehicle 10A. Unlike the illustration, in the preferred embodiment, receptacle 16A is positioned at the rear of vehicle 10A permitting easier connection with electrical cable 15A.

Activation and deactivation of motor/generator 12A is preferably done via radio transmitter 17A which is illustrated exterior to vehicle 10A, but, in the ideal embodiment, the operator of vehicle 10A activates from within vehicle 10A, to activate motor/generator 12A when the operator deems that the rechargeable battery needs to be boosted.

Alternatively, sensor 17B monitors the charge within the rechargeable battery and activates/deactivates motor/generator 12A when needed.

The embodiment, with the electrical connection within vehicle 10A, is illustrated in FIG. 1B. Again, platform 11B is secured to vehicle 10B on which is mounted motor/generator 12A. In this embodiment, electrical cable 15B is passed into trunk 17 to connect with receptacle 16B. Receptacle 16B is optionally created during manufacture of the electric vehicle 10B or is installed as an after-market item.

The embodiment of FIG. 1B provides more protection for the connection between electrical cable 15B and receptacle 16B.

Mounting, and dismounting the assist apparatus to the vehicle is ideally done as a two-step process. In mounting, first the platform is secured to the vehicle and then the motor/generator is secured to the platform. Dismounting is done in the reverse. This two-step process is easier due the component's weight.

Figure 2:
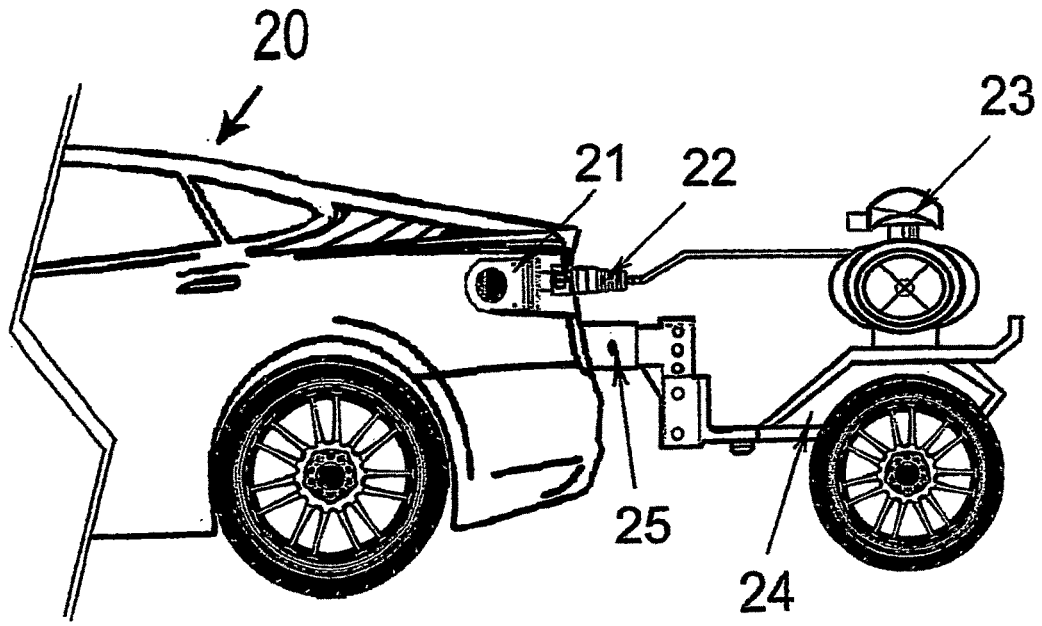
FIG. 2 is side view in which the assist system is being towed as a trailer.

FIG. 2 is side view in which the assist system is being towed as a trailer.

In this embodiment of the invention, vehicle 20 is equipped with a tow bracket 25 which is secured to trailer 24. Motor/generator 23 is carried by trailer 24. Power from the motor/generator 23 is communicated to vehicle 20 and its electrical receptacle 21 via electrical cable 22.

Figure 3:
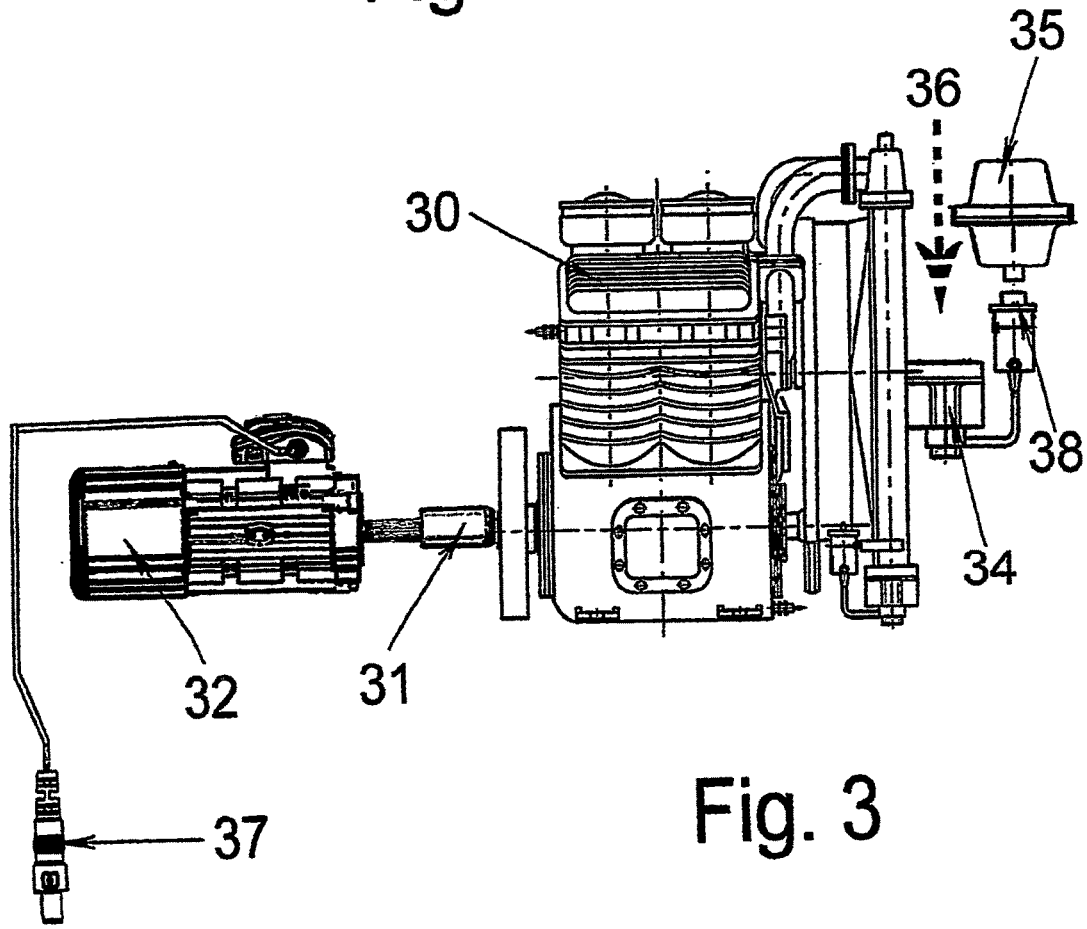
FIG. 3 illustrates the internal combustion engine of the present invention.

FIG. 3 illustrates the internal combustion engine of the present invention.

In the preferred embodiment, motor 30 is a typical internal combustion engine with its exhaust being muffled for noise concerns. Drive shaft 31 from motor 30 drives generator 32 and the electricity therefrom is communicated to the vehicle (not shown) via electrical cable 37.

Motor 30 is powered by hydrocarbon s such as gasoline and diesel in liquid form. Cannister 35 is used to contain hydrocarbons in the gaseous state such as propane and natural gas. Cannister 35 is securable to inlet 38 as indicated by arrows 36.

FIG. 4 illustrates the preferred embodiment of the U-shaped secondary bumper protection of the assist system in which the secondary bumper contacts the bumper on the vehicle.

Bumper 40 is generally U shaped with end of the legs 42 proximate to the vehicle's bumper 43. In this embodiment, legs 42 do not contact bumper 43 except during impact. In other embodiments, legs 42 are held firmly against bumper 43.

FIGS. 5A and 5B illustrate two embodiments which are meant to reduce damage due to impact of the secondary bumper.

Referring to figure SA, a top view and side view of the preferred bumper used to protect the motor/generator, leg 51A (only one shown in this illustration) are hollow and contain a spring 52 which extends from leg 51A so that on impact with the bumper, leg 51A is forced (arrow 54A) toward the electric vehicle's bumper 50A, allowing spring 52 to absorb the impacts force to minimize damage to bumper protecting the motor generator.

In FIG. 5B, a collapsible cannister 53A is secured to leg 51A. When the leg 51A and cannister 53A, are pressed against the vehicle's bumper 50B, collapsible cannister "crumbles" 53B as shown by arrow 54B. This crumbling absorbs the impact force to minimize damage.

Figure 6:
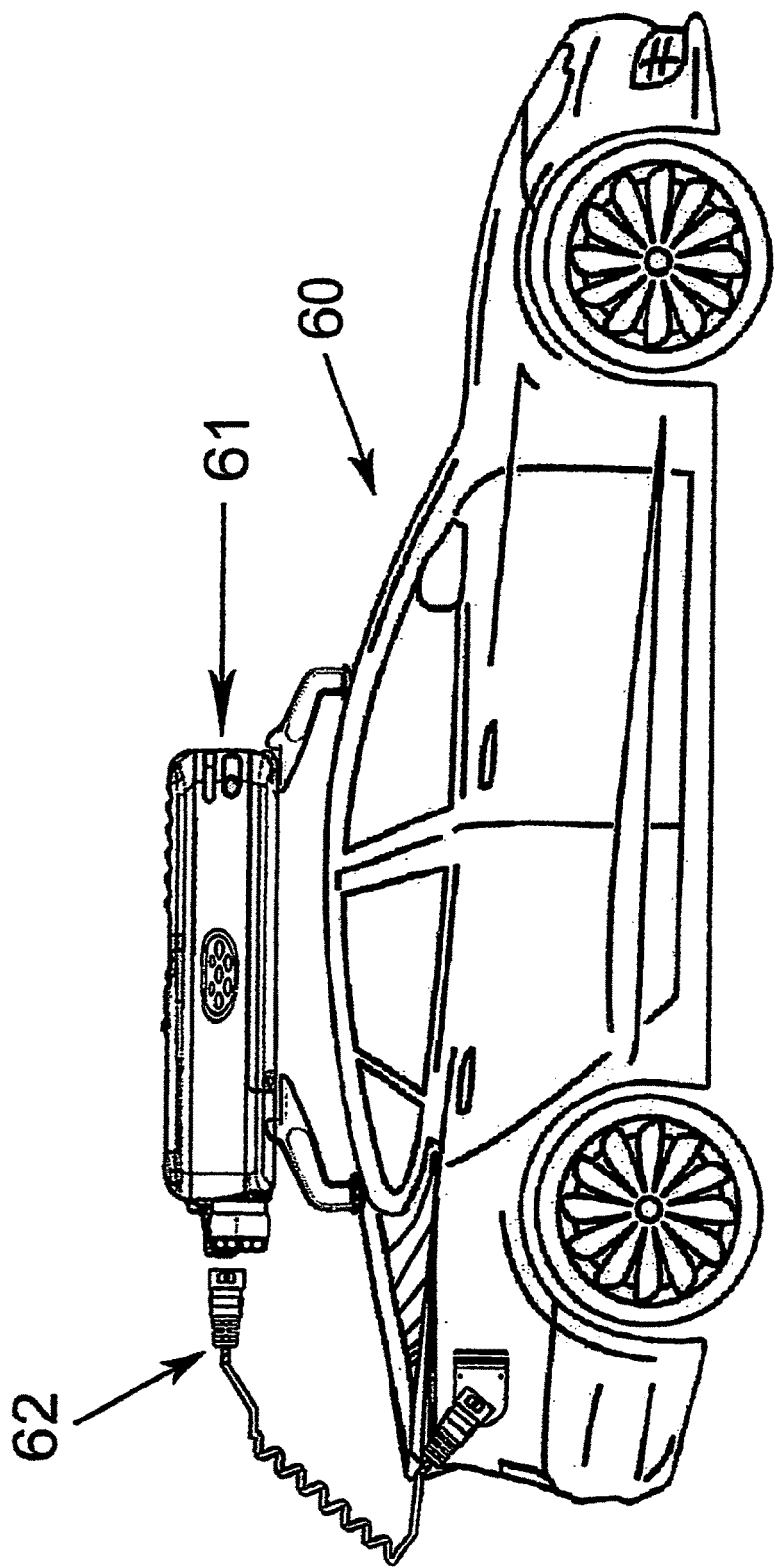
FIG. 6 illustrates an embodiment of the invention in which the charging engine is mounted on the roof of the vehicle.

FIG. 6 illustrates an embodiment of the invention in which the charging engine is mounted on the roof of the vehicle.

In this embodiment, platform and charging engine 61 are mounted on the roof of vehicle 60. Power from charging engine 61 is communicated to the battery (not shown) within the vehicle 60 via electrical cable 62.

Figure 7:
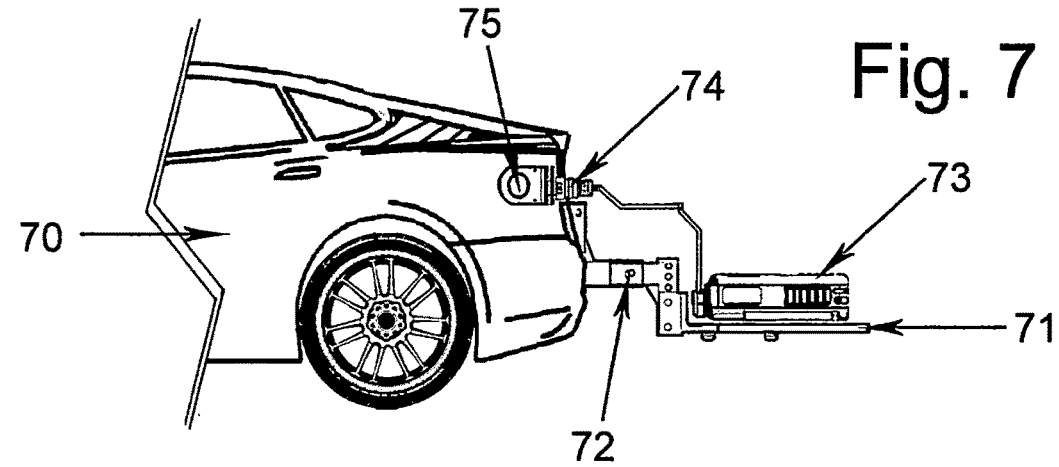
FIG. 7 illustrates the preferred mounting of the auxiliary battery to the electric vehicle.

FIG. 7 illustrates the preferred mounting of the auxiliary battery to the electric vehicle.

Electric vehicle 70 has an internal rechargeable battery (not shown) as discussed above. A recharging connector 75 is used to charge the internal rechargeable battery as discussed above. Electricity from an external source (not shown) is communicated to the internal rechargeable battery via the recharging connector 75.

External battery 73 (ideally rechargeable) is secured to an exterior of the electric vehicle 70 via a cantilevered platform or mounting mechanism 71 which is secured to the vehicle via a slide connector 72. A similar such platform is discussed in FIG. 4 herein.

An electrical connection 74 electrically connects, via the recharging connector 75, the external battery to the internal rechargeable battery, thereby extending the life of internal rechargeable battery.

FIGS. 8A, 8B, and 8C illustrate different mounting mechanisms for the auxiliary battery.

Referring to FIG. 8A, external battery 80A includes flanges 79 which are selectively grasped by the mounting mechanisms 82A and 82B as indicated by arrows 83. This compression by flanges 79, secures the external battery to the platform or mounting mechanism (not shown). Flanges 79 are slidably secured to the mounting mechanism (not shown).

FIG. 8B is another method of securing the external battery to the mounting platform. In this embodiment, external battery 80B has a base member 81B which includes openings 85A and 85B which receive teeth 86A therein when tooth mechanism 84A and 84B are pressed as indicated by arrows 78. Movement of tooth mechanisms 84A and 84B, is ideally accomplished by an electric motor.

In yet another method, FIG. 8C secures the external battery to the mounting platform. In this embodiment, external battery 80C has a base member 81C which include teeth which are engaged by recesses within movable blocks 85B. Movement of blocks 85B, as indicated by arrows 77, is accomplished by manually through levers 87 which are moved as indicated by arrows 88.

In all of the mounts of FIGS. 8A, 8B, and 8C, the external battery is easily installed and released so that it can be replaced at will.

FIGS. 9A and 9B illustrate alternative mounting/towing mechanisms for the auxiliary battery.

FIG. 9A illustrates a top mount for the external battery in a similar fashion to that described relative to FIG. 6. In FIG. 9A though, external battery 90 is secured to mounting mechanism 92 located on the roof of electric vehicle 93A. Electricity from external battery 90A is communicated using conduit/electrical wire 95A via connector 91.

FIG. 9B is similar to the arrangement discussed in FIG. 2. For the external battery embodiment, trailer 94 has a mounting mechanism as discussed above to mount the external battery 90B thereto. In this illustration, the connector for the electrical connection is located within the trunk of electric vehicle 93B and is accessed using electrical conduit wire 95B.

FIG. 10A is a perspective view of the upper side of an embodiment of the invention.

FIG. 10B is a perspective view of the underside of the an embodiment of the invention relative to FIG. 10A

Referring to both figures, the electric vehicle accessory of this embodiment interacts with the internal rechargeable battery within the electric vehicle. In this embodiment, platform 100A (its underside 100B) is secured to the electric vehicle by insert 101 as described above. This embodiment is also applicable for the roof mounted application and the trailer application.

Platform 100A has a mounting surface 113 which includes, in this illustration, four engagement mechanisms 103, each having a prong/finger 104. These prongs/fingers 104, when the engagement mechanism 103 is pressed against battery 102, and engage recesses 105 to secure the electric battery 102 to the surface 113 of platform 100A.

This engagement is ideally accomplished manually using lever 109 which is rotated as indicated by arrow 108. Movement of lever 109, causes internal rod 112 to rotate which moves connecting rods 104 to move the engagement mechanisms 104 to selectively engage or disengage with the battery 102. Alternatively, electric motor 110 is used in lieu of the manually operated lever 108.

Movement of lever 109 also causes relay switch 103 to selectively close or open. Relay switch 103 controls the operation of electrical connector 106 which receives electricity from battery 102 via electrical line 114 and selectively passes the electricity from battery 102 to the rechargeable battery (not shown) via electrical line 103. In this manner, movement of lever allows the operator selectively electrically connect or isolate battery 102 from the rechargeable battery (not shown) within the electric vehicle. This provides additional safety for the operator.

FIG. 11 illustrates a mounting platform.

Battery 123 is placed onto platform 120. To secure the battery 123 to the platform 120, engagement mechanisms 121A and 121B to move and engage battery 123 as outlined above.

It is clear that the present invention provides for an improvement for electric vehicles in order to make these vehicles more acceptable to the general public.

What is claimed is:

1. An electric vehicle assembly, said electric vehicle having an internal rechargeable battery with a recharging connector for communicating electricity from an external source into the internal rechargeable battery, said electric vehicle comprising:
    a) an external battery secured to an exterior of the electric vehicle;
    b) an electrical connection electrically connecting, via the recharging connector, the external battery to the internal rechargeable battery;
    c) a mounting mechanism for selectively securing the external battery to the electric vehicle; and,
    d) wherein the external battery includes protruding teeth and wherein the mounting mechanism includes recesses to engage the protruding teeth.

2. The electric vehicle assembly according to claim 1,
    a) wherein the electric vehicle includes a slide mount for receiving a cantilevered platform;
    b) further including a cantilevered platform secured to the slide mount; and,
    c) wherein the mounting mechanism is secured to the cantilevered platform.

3. The electric vehicle assembly according to claim 2, wherein the mounting mechanism has protruding teeth engaging recesses within the external battery.

4. The electric vehicle assembly according to claim 2, wherein the external battery includes flanges which are selectively grasped by the mounting mechanism.

5. The electric vehicle assembly according to claim 4, wherein the mounting mechanism compresses the flanges of the electric battery.

6. The electric vehicle assembly according to claim 5, wherein the mounting mechanism selectively releases the external battery manually.

7. The electric vehicle assembly according to claim 1,
    a) wherein the electric vehicle includes a trailer hitch adapted to selectively secure a trailer to the electric vehicle;
    b) further including a wheeled trailer; and,
    c) wherein the mounting mechanism is secured to the wheeled trailer.

8. The electric vehicle assembly according to claim 1, wherein the mounting mechanism is secured to a roof of the electric vehicle.

9. An accessory assembly for an electric vehicle being powered solely by an internal rechargeable battery with a recharging connector for communicating electricity from an external source into the internal rechargeable battery, said accessory assembly having an external battery secured to an exterior of the electric vehicle, said external rechargeable battery communicating electricity to the internal rechargeable battery via the recharging connector; a mounting mechanism for selectively securing the external battery to the electric vehicle; and wherein the external battery includes protruding teeth and wherein the mounting mechanism engages the protruding teeth.

10. The accessory assembly according to claim 9, wherein the external battery includes flanges which are selectively grasped by the mounting mechanism.

11. The accessory assembly according to claim 9, wherein the external battery is rechargeable.

12. An electric vehicle accessory, said electric vehicle having an internal rechargeable battery with a recharging connector for communicating electricity from an external source into the internal rechargeable battery, said electric vehicle accessory comprising:
- a) a platform externally securable to the electric vehicle, said platform having,
  - 1) a mounting surface,
  - 2) at least two engagement mechanisms,
  - 3) an electrical connector, and,
  - 4) a connecting electrical cable extending from the electrical connector and connectable to the recharging connector;
- b) an external battery placed on the mounting surface of the platform, said external battery having an electrical cable securable to the electrical connector of the platform; and,
- c) wherein the platform further includes an activation mechanism which selectively,
  - 1) compresses the at least two engagement mechanisms to the external battery to secure the external battery to the mounting surface, and,
  - 2) electrically connects the external battery to the connecting electrical cable of the platform.

13. The electric vehicle accessory according to claim 12, wherein the activation mechanism is manually operated.

14. The electric vehicle accessory according to claim 12, wherein the activation mechanism is electrically operated.

15. The electric vehicle accessory according to claim 12 wherein,
- a) the at least two engagement mechanisms include pins extending therefrom; and,
- b) the external battery includes recesses for receipt of the pins of the at least two engagement mechanisms.

\* \* \* \* \*